F. W. T. TAYLOR.
AERIAL MACHINE.
APPLICATION FILED OCT. 23, 1909.
1,122,171.
Patented Dec. 22, 1914.
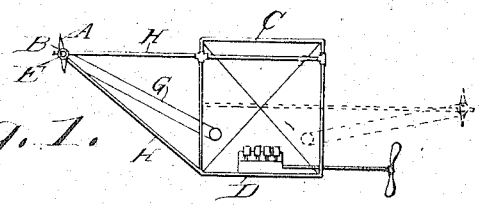
Fig. 1.
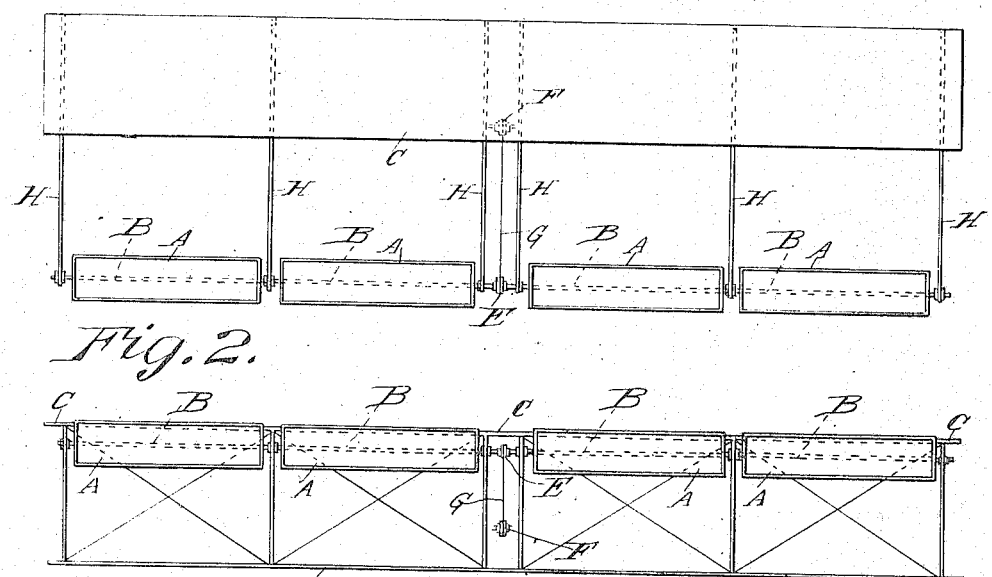
Fig. 2.
Fig. 3.
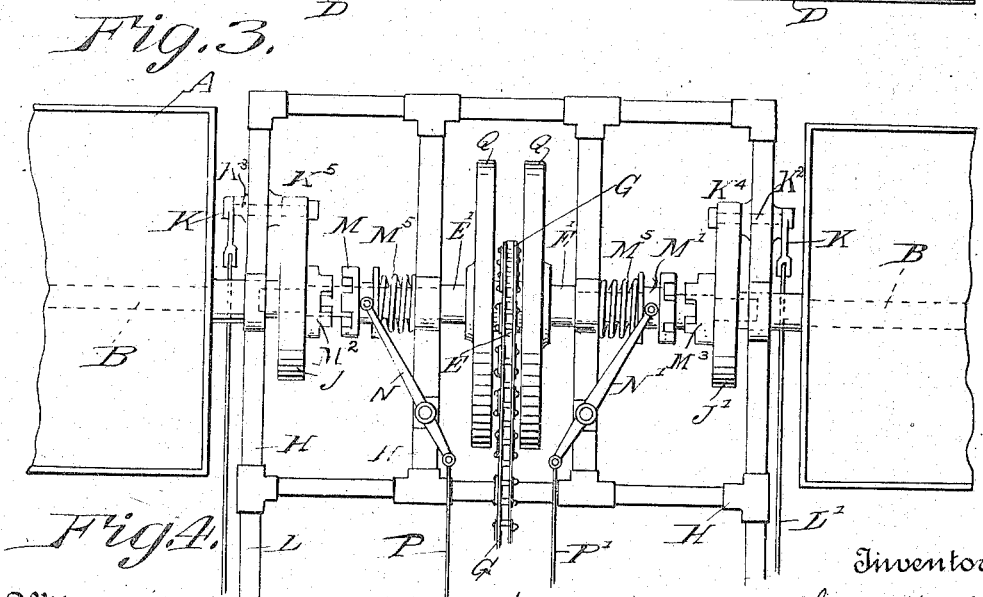
Fig. 4.
Witnesses
P. A. Putnam
L. E. Barkley
Inventor
Frederick William Thomas Taylor
by Franks Auuerman
Attorney

UNITED STATES PATENT OFFICE.

FREDERICK WILLIAM THOMAS TAYLOR, OF CRICKLEWOOD, LONDON, ENGLAND

AERIAL MACHINE.

1,122,171.     Specification of Letters Patent.     Patented Dec. 22, 1914.

Application filed October 23, 1909. Serial No. 524,243.

*To all whom it may concern:*

Be it known that I, FREDERICK WILLIAM THOMAS TAYLOR, of 7 Osborne road, Willesden Green, Cricklewood, London, N. W., England, have invented Improvements in or Connected with Aerial Machines, of which the following is the specification.

This invention relates to means for carrying the method into effect by which an aerial machine may be wholly or partly lifted or supported. My device may also be employed to effect better steering and to insure the stability of such machines.

My invention in its simplest form consists of a plane of any suitable shape mounted on a spindle shaft, or pivots, in such a manner, that half of the area of the plane is on one side of such shaft or pivots and half on the other side. The plane is mounted to rotate freely with the said spindle or pivots, the said spindles or pivots being mounted in bearings fitted in a suitable frame or the like. The said plane is preferably a long and narrow rectangle, and the said pivots are fitted centrally in the ends of such rectangular plane. The center of gravity should coincide with the center of such shaft or spindle and therefore with the center of rotation.

In order that my invention may be completely understood, reference should be made to the appended sheet of drawings.

Figure 1 is an end elevation of my apparatus shown fitted to an aeroplane having two planes. Fig. 2. is a plan of the same but with my rotating planes shown at right angles with the plane in Fig. 1. Fig. 3 is a front elevation of the same with my rotary planes shown in the same position as in Fig. 1. Fig. 4 illustrates a detailed view of the clutches, which form connections between the driven axle and the rotating planes.

A A A A are the rotating planes mounted on the spindle or shaft B and rotatable therewith. The shaft B may be made as one continuous shaft, as shown, or each plane A may be mounted on a separate shaft. The shaft B is mounted in bearings which may be ball bearings carried by the projecting frame arms H of the aeroplane as shown, having the two planes C D of ordinary construction. The planes C D may be provided with a horizontal tail plane or planes, not shown, and with a vertical plane, not shown, both of ordinary construction, the latter to effect horizontal steering.

An engine is fitted to the frame of the aeroplane of any type and any form of propeller may be employed for forward propulsion.

The shaft B carries a sprocket wheel E which is connected by chain G with a sprocket wheel F or the like directly in front of the aeronaut. The sprocket wheel F may be manually operated as by a crank handle of any appropriate type. This is not for the purpose of rotating the planes by power, but so that the planes or plane A may be started to rotate in the desired direction when the forward propulsion occurs.

The planes A have a decided lifting and supporting action when rotating in one direction, *i. e.* with the leading edge ascending, and on the other hand a tendency to immediately plunge the aeroplane downward if rotated in the opposite direction. Consequently, if the planes A A one the one side of the aeroplane are permitted to rotate at their full speed, and the planes on the other side are retarded or stopped, or rotated in the other direction, that side of the aeroplane with the retarded or stopped planes will tend to fall, while the other side will relatively rise. In this manner the stability of the aeroplane may be controlled as well as the horizontal steering action during which action it is necessary that the aeroplane shall be raised on the one side and correspondingly depressed on the other. The leading edge above referred to is the edge of the plane which at any moment happens to be most advanced in the direction of flight. Moreover, the rotating plane or planes insure that the aeroplane cannot plunge vertically to earth and it, or they, are consequently an important means of insuring safety when embodied in the construction of any aerial machine, whether of the heavier than air or the lighter than air type. The rotary movement of the pivoted plane or planes being automatically caused by the resistance and reaction of the air met by the plane in its line of flight, it follows that the speed of rotation is approximately proportional to the velocity of forward motion of the apparatus. In addition to the lateral control effected by differing speeds of the separated rotary planes on the sides of the machine, the rotation of such planes produce great inherent lateral stability provided they are rotated together at uniform speed in the same direction. In addition to the longitudinal control effected by checking or increasing the speed of rotation of the leading rotary plane, such rotary plane produces automatic longitudinal stability in association with any other following portion of the machine having a more constant lift. Owing to the high lifting efficiency of the rotary plane (when rotated in the direction with the leading edge ascending), and to the variable and governable nature of its lift as herein described, the relation of the center of pressure to the center of gravity, in a machine comprising such planes may be more easily regulated and the efficiency of the whole machine, as well as its stability, be thereby increased.

The clutch members M and M' are mounted to slide on the driven axle B, and the teeth thereof are adapted to engage the stationary clutch members M² and M³ rigidly secured to the shaft B, the sliding clutch members being operated by the levers N and N', in one direction and by coiled springs M⁵ in the opposite direction. The levers N and N' are operative by the rods P and P'. The clutch members M² and M³ have rigidly secured thereto, the rollers J and J'. Eccentrically mounted on the shafts K² and K³ are the brake shoes K⁴ and K⁵ which engage the peripheries of the rollers J and J' for retarding the movement of the planes after the clutches have been thrown out of operation. It will be clearly seen that the movement of the levers K is effected only when the rods L and L', which have their ends terminating at a point near the operator's seat, have been moved. In order to assist in maintaining the rotation of the plane A, I have mounted the balance wheels Q adjacent the sprocket and on the stub axle E' and E² which are movable with the main axle B. This gearing, it will be noted, is supported within a frame formed of suitable pipe or other tubular members shown at H.

As the direction of rotary spin of the plane or planes upon the apparatus determines the direction in which it is desired to move, therefore similar planes or vanes may be fitted placed vertical to the direction of flight, such similar planes may be employed mounted on vertical spindles for horizontal steering purposes.

For the purpose of maintaining its rotary spin, each plane may be fitted with a form of governor or fly wheel, the size and weight of which will depend upon the size and area of the plane of which it is to form a part. If the plane is built up of sections each section may be constructed with a small governor or a larger fly wheel may be used to govern the whole plane.

With the object of giving the planes the initial rotary movement and to maintain this rotation in the required direction, they may be driven directly or indirectly by any suitable form of motor and the power may be applied to retard or accelerate the rotary movement.

To further insure against a sudden reverse direction of rotation the shaft B of the planes may be provided with a suitable form of ratchet brake, serving to hold the plane until the application of the power causes it to resume its normal direction of revolution.

The dotted lines in Fig. 1 indicate how a similar plane may be mounted at the back of a biplane or other aeroplane to provide the same lifting effect, or similar steering control, at the back of the aeroplane as well as at the front.

I claim:—

1. In an aerial machine, superimposed main planes, and an auxiliary plane rotatably mounted on said main planes, and adapted to be actuated by the wind in one of two alternative directions, and means connected with the auxiliary plane for starting the plane to rotate in the desired direction.

2. In an aerial machine, superimposed main planes, auxiliary planes supported by the main plane and adapted to be operated by the wind, and gearing associated with the auxiliary planes for starting the rotation of the planes in the desired direction.

3. In an aerial machine, main planes, auxiliary planes mounted to rotate in front of the main planes, an auxiliary rotatable plane mounted to operate at the rear of the main planes, said auxiliary planes being operated by the wind, and means for starting the auxiliary planes to rotate in predetermined directions.

FREDERICK WILLIAM THOMAS TAYLOR.

Witnesses:
  JAS. D. ROOTS,
  H. D. JAMESON.